United States Patent
James

(10) Patent No.: US 8,945,398 B2
(45) Date of Patent: Feb. 3, 2015

(54) WATER RECOVERY SYSTEM SAGD SYSTEM UTILIZING A FLASH DRUM

(75) Inventor: Kenneth James, Calgary (CA)

(73) Assignee: 1nSite Technologies, Ltd., Calgary, Alberta (CA)

( * ) Notice: Subject to any disclaimer, the term of this patent is extended or adjusted under 35 U.S.C. 154(b) by 953 days.

(21) Appl. No.: 13/074,283

(22) Filed: Mar. 29, 2011

(65) Prior Publication Data

US 2012/0047941 A1  Mar. 1, 2012

Related U.S. Application Data

(60) Provisional application No. 61/376,300, filed on Aug. 24, 2010.

(51) Int. Cl.
*B01D 1/22* (2006.01)
*B01D 3/06* (2006.01)
(Continued)

(52) U.S. Cl.
CPC .............. *C02F 1/06* (2013.01); *B01D 1/0005* (2013.01); *C02F 1/24* (2013.01); *C02F 1/40* (2013.01); *C02F 2101/32* (2013.01);
(Continued)

(58) Field of Classification Search
CPC .......... B01D 1/00; B01D 1/0005; B01D 1/22; B01D 1/222; B01D 1/101; B01D 3/06; B01D 3/08; B01D 37/00; C02F 1/06; C02F 1/08; C02F 1/24; C02F 1/40; C02F 9/00; C02F 2101/32; C02F 2103/32; C02F 2103/365; C02F 2201/008; F28D 1/02; F28D 21/0012; F28F 5/02; F28F 13/00; F28F 19/00
USPC .............. 95/172, 247, 266, 259; 96/193, 210, 96/218; 210/175, 182, 703, 774, 799, 806, 210/259; 60/772, 782–784; 208/39, 41, 208/187, 188, 361–363, 366, 390; 203/10, 203/14, 88, 91, 92, 95, 39; 159/11.1, 11.2, 159/12, 47.1, 47.3; 196/112, 114, 134; 62/606; 165/89
See application file for complete search history.

(56) References Cited

U.S. PATENT DOCUMENTS 2,920,039 A * 1/1960 Miller ........................... 208/361
3,155,600 A   11/1964 Williamson
(Continued)

FOREIGN PATENT DOCUMENTS

CA     2547503     6/2005
CA     2609859     5/2009
(Continued)

*Primary Examiner* — Joseph Drodge
(74) *Attorney, Agent, or Firm* — Fay Sharpe LLP

(57) ABSTRACT

A water recovery process for a steam assisted gravity drainage system for a heavy oil recovery facility, the process comprising a flash drum and a flash drum heat exchanger/condenser, wherein the water recovery process receives hot water produced by a facility at a temperature above the water atmospheric boiling point and cools it to a temperature below the water atmospheric boiling point before transferring it to the remaining section of the water recovery process.

18 Claims, 4 Drawing Sheets

(51) Int. Cl.
    *B01D 3/08*      (2006.01)
    *B01D 37/00*     (2006.01)
    *C02F 9/00*      (2006.01)
    *F28D 1/02*      (2006.01)
    *F28D 5/02*      (2006.01)
    *F28F 5/02*      (2006.01)
    *F28F 19/00*     (2006.01)
    *F25J 1/00*      (2006.01)
    *F25J 3/00*      (2006.01)
    *C02F 1/06*      (2006.01)
    *B01D 1/00*      (2006.01)
    *C02F 1/24*      (2006.01)
    *C02F 1/40*      (2006.01)
    *C02F 101/32*    (2006.01)
    *C02F 103/36*    (2006.01)
    *F28D 21/00*     (2006.01)

(52) U.S. Cl.
    CPC .... *C02F 2103/365* (2013.01); *C02F 2201/008* (2013.01); *F28D 21/0012* (2013.01); *F28F 19/00* (2013.01)
    USPC ............... 210/774; 95/173; 95/178; 95/254; 95/259; 96/201; 96/218; 159/11.1; 159/11.2; 159/47.1; 159/47.3; 196/112; 196/114; 196/134; 203/14; 203/88; 203/91; 203/92; 203/95; 208/39; 208/187; 208/361; 210/175; 210/182; 210/259; 210/703; 210/799; 210/806

(56) References Cited

U.S. PATENT DOCUMENTS

| | | | |
|---|---|---|---|
| 4,002,538 A | 1/1977 | Pottharst, Jr. | |
| 4,428,328 A | 1/1984 | Ratliff | |
| 4,683,025 A | 7/1987 | Flores | |
| 4,880,533 A | 11/1989 | Hondulas | |
| 4,924,936 A | 5/1990 | McKown | |
| 4,938,876 A * | 7/1990 | Ohsol | 210/708 |
| 5,415,673 A * | 5/1995 | Hilton et al. | 48/197 R |
| 5,906,714 A | 5/1999 | Gramkow et al. | |
| 5,948,242 A * | 9/1999 | Ohsol et al. | 208/181 |
| 6,019,818 A | 2/2000 | Knapp | |
| 6,199,834 B1 | 3/2001 | Popov et al. | |
| 6,234,760 B1 | 5/2001 | Popov et al. | |
| 6,244,098 B1 | 6/2001 | Chen et al. | |
| 6,315,000 B1 | 11/2001 | Goodyear | |
| 6,418,957 B1 | 7/2002 | Goodyear | |
| 6,536,523 B1 | 3/2003 | Kresnyak et al. | |
| 6,938,583 B2 | 9/2005 | Wood | |
| 7,306,057 B2 | 12/2007 | Strong et al. | |
| 7,326,285 B2 | 2/2008 | Chowdhury | |
| 7,591,309 B2 * | 9/2009 | Minnich et al. | 166/266 |
| 7,647,976 B2 | 1/2010 | Tsilevich | |
| 7,670,573 B2 * | 3/2010 | Stell et al. | 422/198 |
| 7,681,643 B2 | 3/2010 | Heins | |
| 2002/0043289 A1 | 4/2002 | Goodyear | |
| 2007/0007172 A1 | 1/2007 | Strack et al. | |
| 2007/0051513 A1 | 3/2007 | Heins | |
| 2008/0093264 A1* | 4/2008 | Sarkar et al. | 208/196 |
| 2008/0110630 A1 | 5/2008 | Minnich et al. | |
| 2009/0020456 A1 | 1/2009 | Tsangaris et al. | |
| 2009/0084707 A1 | 4/2009 | Gil | |
| 2010/0058771 A1 | 3/2010 | Gil et al. | |
| 2011/0036308 A1 | 2/2011 | Betzer-Zilevitch | |
| 2011/0061816 A1 | 3/2011 | Duesel, Jr. et al. | |
| 2011/0089013 A1 | 4/2011 | Sakurai et al. | |
| 2012/0000642 A1 | 1/2012 | Tsilevich | |
| 2012/0179624 A1* | 7/2012 | Berry et al. | 705/338 |
| 2012/0192716 A1* | 8/2012 | Chen et al. | 95/263 |

FOREIGN PATENT DOCUMENTS

| | | |
|---|---|---|
| CA | 2610052 | 5/2009 |
| WO | WO 2005/054746 A2 | 6/2005 |
| WO | WO2008098242 A2 | 8/2008 |

* cited by examiner

FIGURE: 2

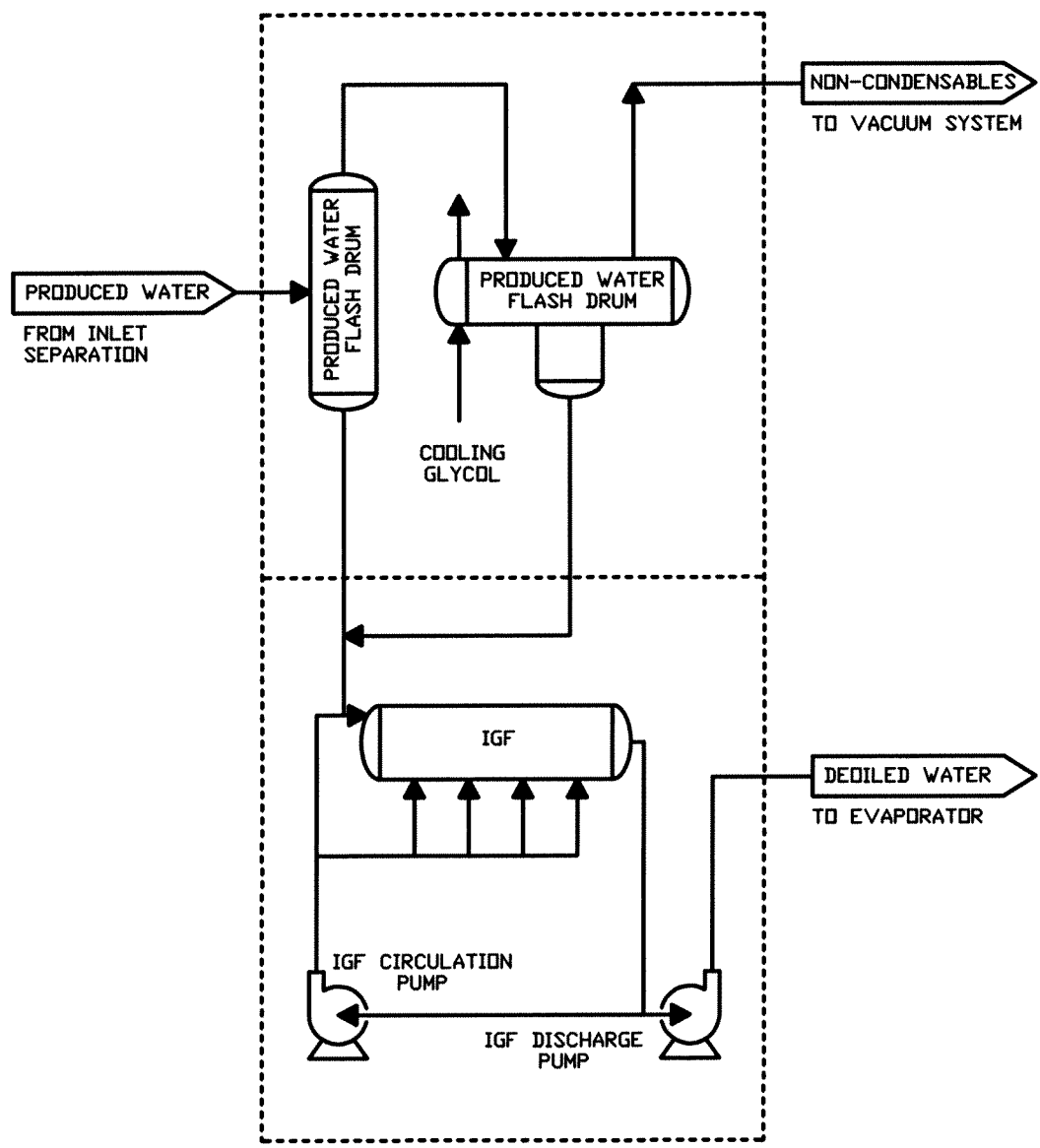
FIGURE: 4

WATER RECOVERY SYSTEM SAGD SYSTEM UTILIZING A FLASH DRUM

FIELD OF THE INVENTION

This invention pertains to the field of water recovery systems in the oil industry utilizing flash drums, specifically for cooling water for the oil water separation process.

BACKGROUND OF THE INVENTION

With today's energy costs and the need to reduce emissions, the release of a water steam to the atmosphere becomes a wasteful and non-economical practice. Therefore, every facility strives to recycle as much water, steam and heat as much as possible.

In current industry Steam Assisted Gravity Drainage (SAGD) facilities the produced water from the oil/water separation first sent to produced water coolers. The purpose of these coolers is to cool the water to well below the flash point (to a temperature of approximately 80° C.) before the water is further treated to ensure that no flashing will occur downstream of the coolers. After cooling, the produced water is typically sent to a skim oil tank, then to an Induced Gas Floatation (IGF) unit and finally to an Oil Removal Filter (ORF). These serve to remove trace oil from the water before it is sent to an evaporator or warm lime softener.

There are a few issues with the current industry practice. The produced water coolers in most SAGD facilities have been found to be a high fouling service. These exchangers can cause serious maintenance issues with the requiring manual cleaning on a weekly basis. The manual cleaning of the exchangers is a labor intensive process and also poses health and safety (HSE) issues. In order to manually clean the exchanger while maintaining production, spare exchangers with their associated piping and valves are generally installed. Manual cleanings can be minimized but not eliminated through use of online cleanings.

Further the water must be reheated prior to introduction into downstream water treatment (hot/warm lime softening or evaporator). This cooling and reheating of the water increases the capital, operating and maintenance costs of a facility.

The process of using produced water coolers to eliminate flashing has been used since the first SAGD facility was designed. The industry has tried to tackle the high fouling issues with limited success and has turned to trying to more effectively clean the fouling from the exchanger. The industry has looked at the design of the exchangers and the operating conditions to try to maintain the produced water stream at as high a temperature as possible. The exchanger fouling has been seen to increase with a decrease in outlet temperature of the process stream.

Processors have also looked at ways of cleaning the exchanger while still in service. This has been attempted by running a high temperature stream through the exchanger to remove the fouling by re-dissolving the deposit into solution. These solutions have decreased the maintenance required on the exchangers and lengthened the time between shutdowns of the equipment, but have not solved the fouling problem.

There is therefore, still a need in the industry for a better solution for water treatment unit, which requires less maintenance due to fouling, is economical to operate and at the same time prevents flashing later in the process.

The objective of this invention is to provide a system which reduces the maintenance costs of a facility by devising a way to eliminate the high fouling produced water exchangers.

Another objective of this invention is to reduce the capital and operating costs of the facility by having the produced water entering the downstream equipment as hot as possible and minimize the reheating equipment. This results in less energy being used to re-heat the water later in the process.

Lastly, the produced water coolers are generally multiple shell and tube exchangers. These are relatively expensive pieces of equipment. There is an opportunity to reduce the capital cost of the facility by eliminating this equipment.

Other benefits and features of the invention would be apparent to the person skilled in the art from review of the following claims, drawings and descriptions of the preferred embodiments.

SUMMARY OF THE INVENTION

The proposed solution is to use a produced water flash drum downstream of the primary oil/water separation. Cooling will be achieved by flashing a portion of the produced water stream as a result of reduced pressure with a slight vacuum. The flash drum condenser will then be used to condense and sub-cool the flashed vapours. The sub-cooled water is then mixed with the water from the produced water flash drum and is routed to a final water treatment unit, preferably an induced gas floatation unit, or alternatively oil filters or oil scrubbers for further treating. The flash drum operates below the atmospheric pressure ensuring there will be no flashing at any downstream destinations operating at an atmospheric pressure, including the induced gas floatation unit and the produced water tank.

According to the primary aspect of the invention, there is provided a water recovery process in a steam assisted gravity drainage system for a heavy oil recovery facility, the process comprising a flash drum and a flash drum heat exchanger/condenser, wherein the water recovery process receives hot water [1] produced by a facility at a temperature above the water atmospheric boiling point and cools it to a temperature below the water atmospheric boiling point before transferring it to the remaining section [7] of the water recovery process.

The hot water [1] produced contains impurities, such as traces of oil. Therefore, according to yet another aspect of the invention the water recovery process further comprises a final water treating unit such as a floatation unit, an oil removal unit, oil scrubber or alike for the removal of said impurities from the water.

Preferably, the final water treating unit can be an induced gas flotation unit, or oil removal filters, or both in series.

According to yet another aspect of the invention there is provided a water recovery process having a flash drum, a flash drum heat exchanger/condenser and final water treating equipment such as an oil removal unit, oil scrubber or the like. During the process, the hot water produced (containing impurities) [1] is introduced into the flash drum, and separated into a cooled liquid (with impurities) [5] and a vapour [3]. The vapour being further cooled in the flash drum heat exchanger/condenser into the condensed liquids [6]. This liquid [6] from the flash drum heat exchanger/condenser is mixed with the cooled liquid [5], into the mixture [7]. This mixture [7] being transferred into the final water treating unit in which the impurities are removed from the water and the cleaned water [8] transferred to the rest of the process [9] or to atmospheric tanks [10] for storage.

According to yet another aspect of the invention, the flash drum operates below the atmospheric pressure to prevent flashing in the downstream equipment.

Preferably, the operating pressure of the flash drum is between (+10) kPag to (−10) kPag, and more preferably (−5) kPag.

More preferably the flash drum heat exchanger/condenser receives the water vapour [3] from the flash drum and chills that vapour to produce a chilled vapour and liquid stream [4, 6] to a temperature below the water atmospheric boiling point in a range of (40)° C. to (100)° C.

According to yet another aspect of the invention, the flash drum heat exchanger/condenser receives the water vapour from the flash drum and the final water treating unit such as an induced gas flotation unit, and chills that vapour to a temperature below the water atmospheric boiling point in a range of (40)° C. to (100)° C.

According to still another aspect of the invention, the hot water [1] temperature is between (100)° C. and (180)° C. with a pressure between (0) kPag and (1400) kPag. While the water [5] exiting the flash drum is at its bubble point temperature at a pressure between (−17) kPag and (0) kPag, and the vapour [3] is at its bubble point temperature at a pressure between (−17) kPag and (0) kPag. The water [6] exiting the flash drum heat exchanger/condenser is at a temperature between (40)° C. and (100)° C.

Further the combined water [7] entering the final water treating unit is at a temperature between (90)° C. and (100)° C. And eventually the water [8] exiting the final water treatment unit is at a temperature of between (90)° C. and (100)° C.

According to another preferred aspect of the invention, the flash drum heat exchanger/condenser and the flash drum are physically located above the final water treatment unit to provide normal pump suction head. In the specific use of a gas floatation unit, this normal head is between (2) m and (6) m water for the gas floatation unit discharge and recirculation pumps.

Preferably, the flash drum heat exchanger/condenser is cooled by a glycol/water coolant mixture or the like or air cooled. This heat exchanger fouls considerably less when compared to prior known operational processes not including a flash drum. The considerable less fouling means that the cleaning maintenance of the flash drum heat exchanger/condenser is extended from the almost weekly basis to the intended annual basis in conjunction with a plant shutdown for other maintenance requirements.

According to yet another aspect of the invention, cold make-up water is directed to the flash drum for preheating the make-up water and reducing the amount of coolant in the flash drum heat exchanger/condenser.

All those benefits allow use of this system in a transportable modular system for a steam assisted gravity drainage crude oil recovery from oil sands, comprising a water recovery process.

BRIEF DESCRIPTION OF THE DRAWINGS

FIG. 4 is a schematic illustration of the layout of the equipment according to the preferred embodiment of the invention showing relative elevations.

DETAILED DESCRIPTION OF THE DRAWINGS

Flash drum also known as knock—out drum, and vapour—liquid separator is a vertical vessel used to depressurise, flash into a vapour/liquid, and separate vapour liquid mixtures. Gravity causes the liquid to settle to the bottom of the vessel and the vapour travels upwards at a design velocity which minimizes the entrainment of any liquid droplets in the vapour as it exits the top of the vessel. The feed to the vapour liquid separator may be a liquid that is being partially or totally flashed into a vapour and liquid as it enters a separator.

The flash evaporation occurs when a saturated liquid stream undergoes a reduction in pressure and part of this liquid is immediately flashes into vapour. Both the vapour and the residual liquid are cooled to the saturation temperature of the liquid at the reduced pressure.

Figure 1:
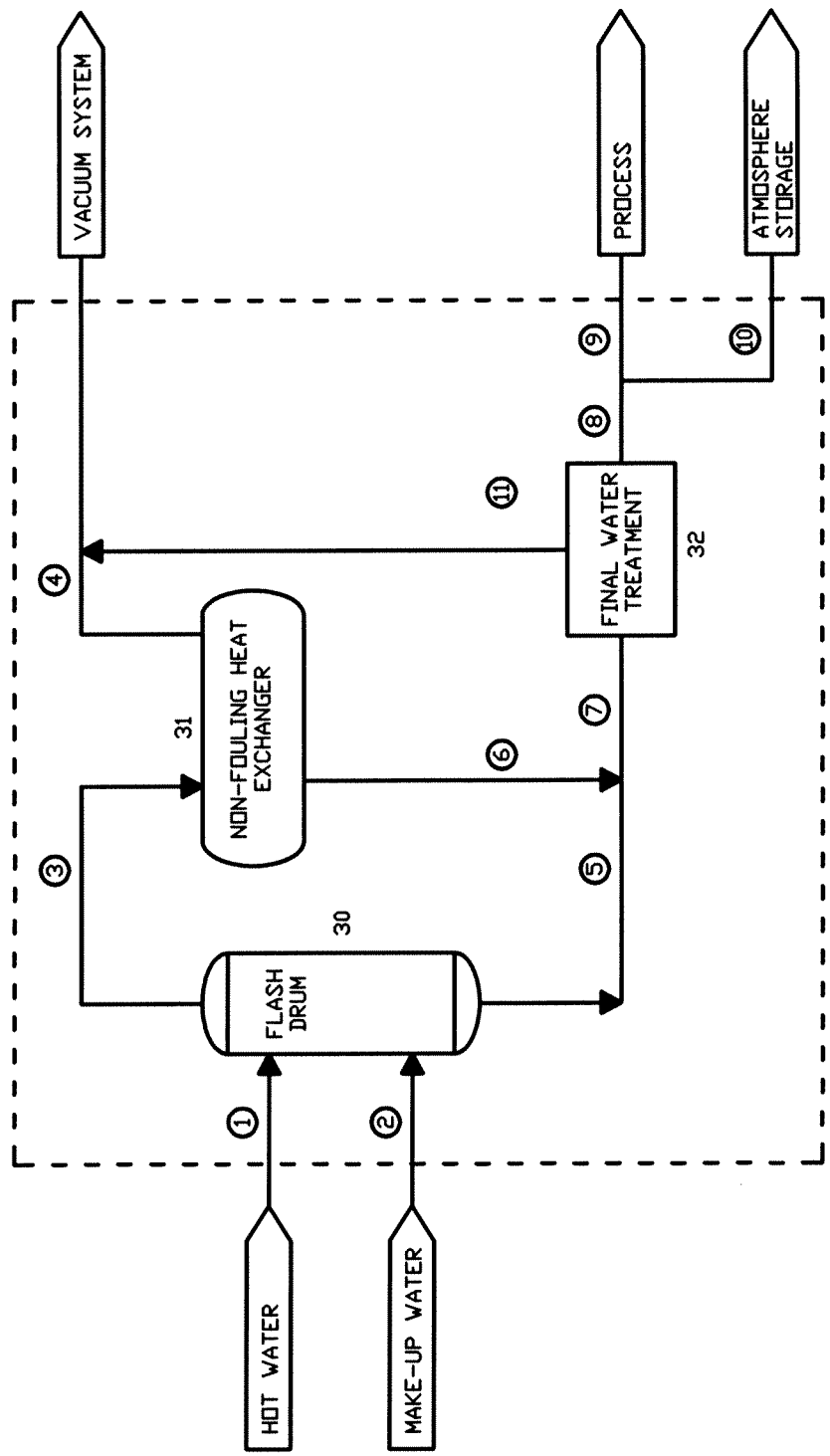
FIG. 1 is a schematic diagram of the water recovery process.

FIG. 1 illustrates the main compounds of the water treatment unit Flash drum [30], flash drum heat exchanger/condenser [31] and final water treatment unit [32]. Further it presents the main flows in the system: Hot water [1], makeup water [2], steam from flash drum [3], vapours from heat exchanger [4], cooled water from flash drum [5] cooled water from heat exchanger [6] mixed cooled water [7] entering the final water treatment unit, clean water exiting the water treatment unit [8], vapour exiting the water treatment unit [11], this vapour may be directed to the heat exchanger or to the vacuum system and to the vapour recovery unit.

Figure 2:
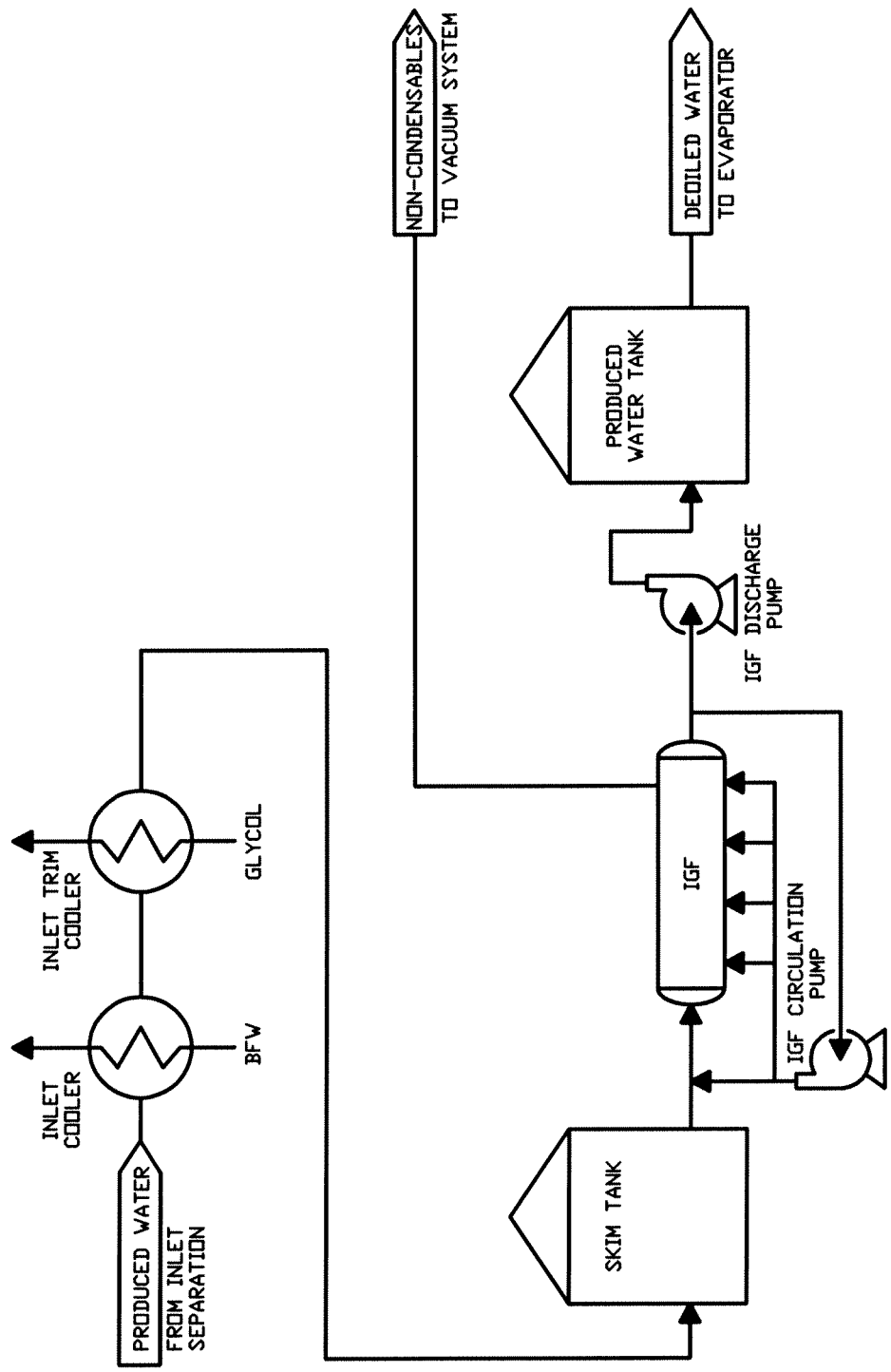
FIG. 2 is a schematic diagram of the typical water recovery process and equipment currently employed in the industry.
Figure 3:
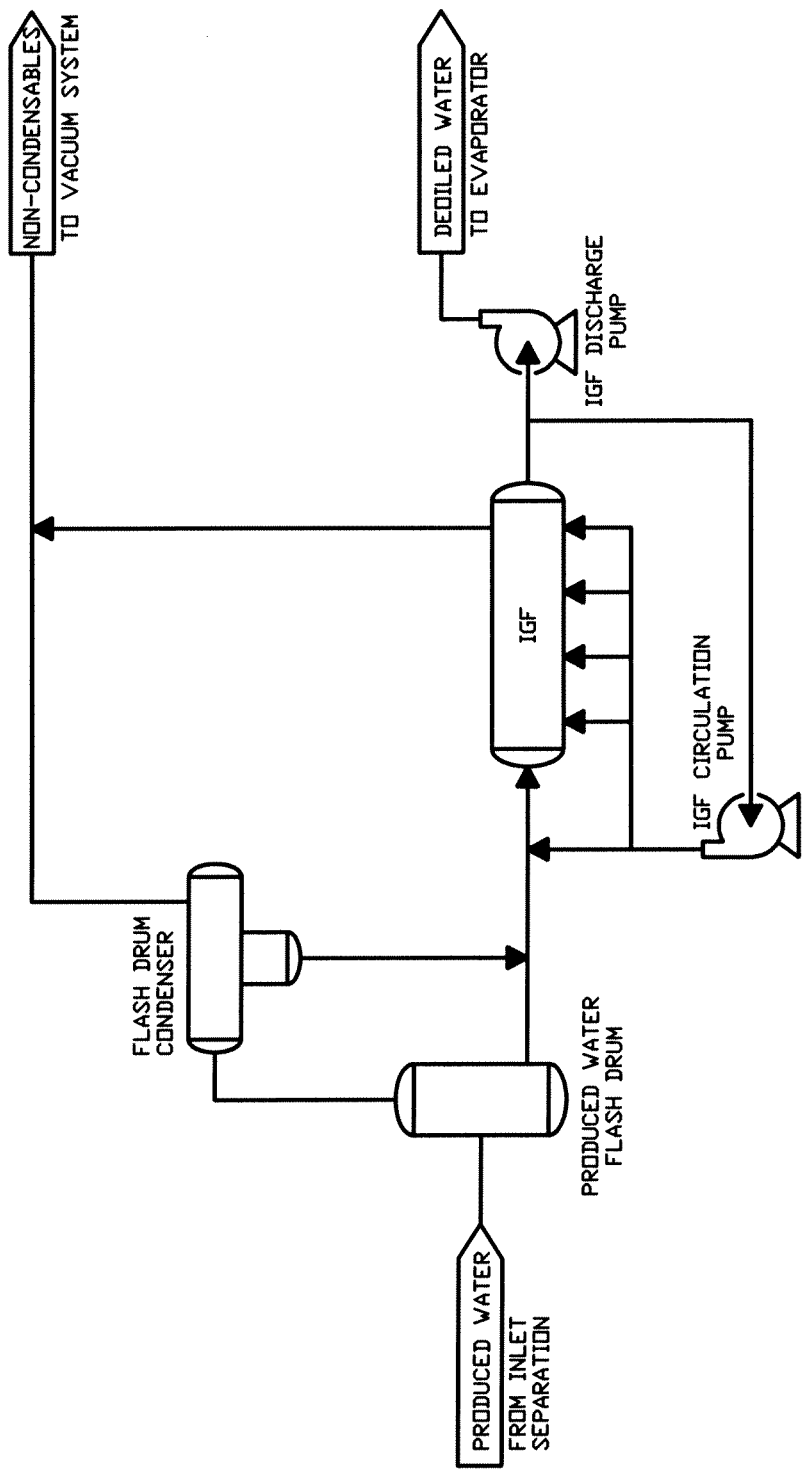
FIG. 3 is a schematic process of the facility using the new process and equipment.

FIG. 2 illustrates the equipment and material flow which is currently used in the industry to be compared to the FIG. 3 illustrating the improved equipment setting and material flow. It is easy to see that two heat exchangers "Inlet Cooler" and "Inlet Trim Cooler" were replaced with "Produced Water Flash Drum" and "Flash Drum Condenser". Further, the "Skim Tank" is eliminated from the process.

FIG. 4 illustrates the higher elevation position of flash drum and condenser related to each other and above the IGF unit.

The produced water will come from oil/water separation and enter the produced water flash drum where it is flashed at an atmospheric pressure. The water stream is cooled to 98° C. by the energy required to flash a portion of the water stream. The flashed vapours are sent along with the induced gas floatation unit vent, and evaporator vent to the flash drum condenser and condensed/sub-cooled to 90° C. using cooling glycol. This stream is then mixed with the water from the flash drum to make a sub-cooled stream at 97° C. which is sent to the IGF.

Flashing the produced water below the atmospheric pressure makes it possible to run the floatation unit at a higher operating temperature with minimal flashing occurring. The design will utilize the liquid head available from placing the flash drum on the second level of the modules to ensure the proper flow between equipment and to provide the required NPSH (Net Positive Suction Head) for the IGF recirculation pumps and discharge pumps. The flash drum pressure will preferably be set to −5 kPag, utilizing the partial vacuum provided by the fuel gas system ejector to maintain the desired pressure. The temperature exiting the IGF in this design will be approximately 97° C., which is 17° C. warmer than the typical temperature at this point in a SAGD facility.

Using a flash drum and a flash drum heat exchanger/condenser accomplishes the required cooling of the produced water stream.

Flashing the produced water below the atmospheric pressure prevents flashing in the downstream atmospheric equipment.

Collection of the floatation unit and evaporator vents with the flash drum flashing vapours captures anything that does flash.

The main benefit to this change is a decrease in maintenance frequency and cost. The flash drum is less likely to foul than a heat exchanger and the flash drum condenser is condensing flashed steam, which is a clean service and is far less likely to cause it to foul. This greatly decreases the maintenance costs associated with this section of a SAGD facility. The estimated saving will be approximately $500K (CDN, 2010) annually. It also decreases the HSE and environmental issues associated with opening and cleaning a heat exchanger fouled with hydrocarbon deposits requiring disposal.

This change allows the produced water stream to be kept at a higher temperature resulting in less energy requirement to heat the water to the evaporator operating temperature. It is estimated that this will also reduce the operating costs of the facility by another $500K (CDN, 2010) annually for a 7,200 BPSD plant.

Lastly, this system replaces multiple shell and tube heat exchangers and skim tank with a flash drum and a smaller single shell and tube exchanger. This system also eliminates reheating exchanger and reduces the size of utility heating and cooling systems. It is estimated that this will decrease the capital cost of the facility by another $800K (CDN, 2010).

The preferred equipment used in the process, is provided below:
a) Produced Water Flash Drum
b) Flash Drum Condenser
c) IGF Package As many changes can be made to the preferred embodiment of the invention without departing from the scope thereof; it is intended that all matter contained herein be considered illustrative of the invention and not in a limiting sense.

I claim:

1. A water recovery process for SAGD (Steam Assisted Gravity Drainage) system for a heavy oil recovery facility, the process comprising:
providing a flash drum and a flash drum heat exchanger/condenser;
separating oil from water;
receiving in the flash drum hot water produced after the step of separating oil from water, the hot water being at a temperature above the water atmospheric boiling point;
cooling the hot water in the flash drum and the flash drum heat exchanger to a temperature below the water atmospheric boiling point; and
transferring the cooled water to a remaining section of the water recovery process.

2. The water recovery process of claim 1, wherein the hot water produced contains impurities, such as traces of oil, the water recovery process further comprising providing a final water treating unit; and
removing at least some of said impurities from the water with the final water treating unit.

3. The water recovery process of claim 2 wherein the final water treating unit comprises at least one of an induced gas flotation unit and oil removal filters.

4. A water recovery process comprising:
providing a flash drum, a flash drum heat exchanger/condenser and a final water treating unit;
introducing a hot water produced after a separation of oil from water into the flash drum;
separating the hot water produced into a cooled liquid and a vapour;
cooling the vapour in the flash drum heat exchanger/condenser;
mixing the condensed liquids from the heat exchanger with the cooled liquid, from the flash drum heat exchanger/condenser forming a mixture;
transferring this mixture into the final water treating unit, removing impurities from the water;
producing a cleaned water;
transferring the cleaned water to a remainder of the water recovery process or to atmospheric tanks for storage.

5. The water recovery process of claim 1 or 4 wherein the flash drum operates below the atmospheric pressure to prevent flashing in the down stream equipment.

6. The water recovery process of claim 1 or 4 wherein the operating pressure of the flash drum is between (+10) kPag to (−10) kPag.

7. The water recovery process of claim 1 or 4 wherein the flash drum heat exchanger/condenser receives the water vapour from the flash drum and chills that vapour, to produce a chilled vapour and liquid stream to a temperature below the water atmospheric boiling point in a range of $(40)°$ C. to $(100)°$ C.

8. The water recovery process of claim 1 or 4 wherein the flash drum heat exchanger/condenser receives the water vapour from the flash drum and the final water treating unit, and chills that vapour, to produce a chilled vapour and liquid stream to a temperature below the water atmospheric boiling point in a range of $(40)°$ C. to $(100)°$ C.

9. The water recovery process of claim 1 or 4 wherein the hot water temperature is between $(100)°$ C. and $(180)°$ C. with a pressure between (0) kPag and (1400) kPag.

10. The water recovery process of claim 1 or 4 wherein the water exiting the flash drum is at its bubble point temperature at a pressure between (−17) kPag and (0) kPag, and the vapour is at its bubble point temperature at a pressure between (−17) kPag and (0) kPag.

11. The water recovery process of claim 1 or 4 wherein the water exiting the flash drum heat exchanger/condenser is at a temperature between $(40)°$ C. and $(100)°$ C.

12. The water recovery process of claim 4 wherein the combined water entering the final water treating unit is at a temperature between $(90)°$ C. and $(100)°$ C.

13. The water recovery process of claim 4 wherein the water exiting the final water treatment unit is at a temperature of between $(90)°$ C. and $(100)°$ C.

14. The water recovery process of claim 4 wherein the flash drum heat exchanger/condenser and the flash drum are physically located above the final water treating unit to provide a pump suction head.

15. The water recovery process of claim 4 wherein the final water treating unit includes a gas floatation unit, and wherein a pump suction head is between (2) m and (6) m water for the gas floatation unit.

16. The water recovery process of claim 1 or 4 wherein the flash drum heat exchanger/condenser is cooled by glycol.

17. The water recovery process of claim 1 or 4 wherein cold make-up water is directed to the flash drum and further including preheating the water and reducing the amount of coolant in the flash drum heat exchanger/condenser.

18. The water recovery process of claim 1 or 4, wherein the process is conducted with a system that is transportable and modular and is suitable for crude oil recovery from oil sands.

* * * * *